United States Patent [19]

Jaeger et al.

[11] 4,313,216

[45] Jan. 26, 1982

[54] DUAL FREQUENCY RADAR RECEIVER

[75] Inventors: James L. Jaeger, West Chester; Michael D. Valentine, Cincinnati, both of Ohio

[73] Assignee: Cincinnati Microwave, Inc., Cincinnati, Ohio

[21] Appl. No.: 231,530

[22] Filed: Feb. 4, 1981

Related U.S. Application Data

[63] Continuation of Ser. No. 41,264, May 21, 1979, abandoned.

[51] Int. Cl.³ .......................... H04B 17/00; H04B 1/26
[52] U.S. Cl. .................................... 455/226; 455/315; 343/55 A
[58] Field of Search .................... 455/145–148, 455/161, 207, 209, 214, 226, 168, 313–316; 324/77 C, 77 CS; 343/55 A, 17.7

[56] References Cited

U.S. PATENT DOCUMENTS

| | | | |
|---|---|---|---|
| 2,502,294 | 3/1950 | Wallace | 455/147 |
| 3,649,919 | 3/1972 | Fridman et al. | 455/209 |
| 3,701,949 | 10/1972 | Turkish | 455/147 |
| 3,745,465 | 3/1973 | Stover | 455/226 |
| 3,932,814 | 1/1976 | Niki | 455/147 |
| 3,992,670 | 11/1976 | Gittins et al. | 455/226 |
| 4,001,695 | 1/1977 | Hrbacek et al. | 455/226 |
| 4,009,442 | 2/1977 | Von Bromssen | 455/161 |

Primary Examiner—Jin F. Ng
Attorney, Agent, or Firm—Biebel, French & Nauman

[57] ABSTRACT

A radar receiver for detecting quasi-harmonically related radar signals includes an antenna system (10) having a mixer (15) included therein. One harmonic from a local oscillator (20) mixes with a signal at a first frequency to produce an intermediate frequency, and another harmonic of the local oscillator mixes with an input signal at a second frequency also to produce an intermediate frequency. A second mixer (30) and local oscillator (40) may be provided. A bandwidth limited signal detecting system preferably includes a band pass filter (50), a limiting IF amplifier (55) and a frequency discriminator (60). The frequency of either the first or second local oscillator is repeatedly varied by a sweep generator (35) to insure that the presence of a radar signal will pass through the band pass filter (50) and be detected. A low pass filter (65) reduces the noise component output of the discriminator, and a comparator (70) provides output pulses whenever a radar signal within either of the quasi-harmonically related frequency ranges is detected. Radar signals at the two frequencies can be distinguished from each other by the time between the pulses generated as detected by a circuit including a one-shot (110), a counter (120), a clock (115), gates (125, 130, 135, 140), and indicators (145, 150).

2 Claims, 5 Drawing Figures

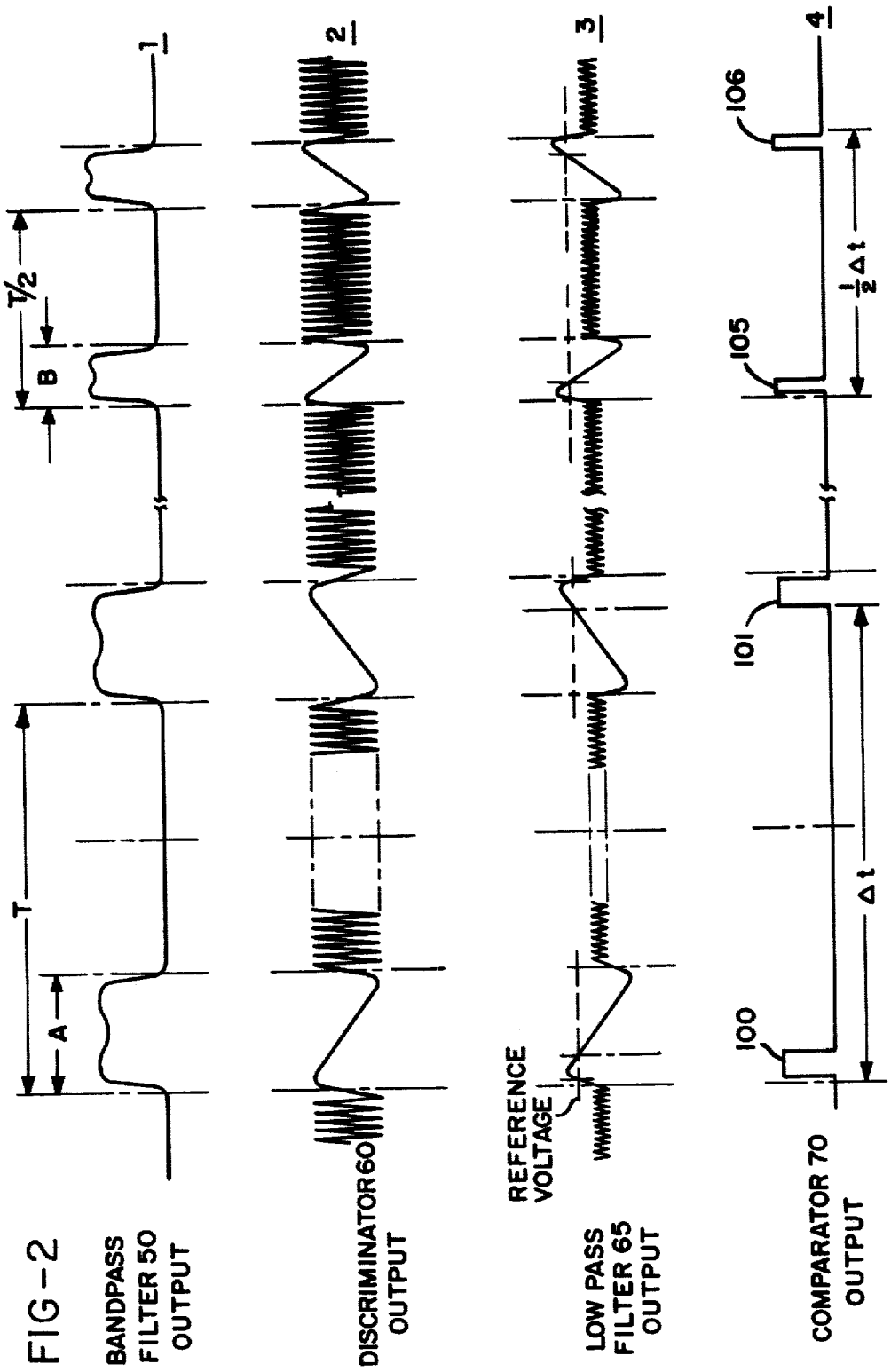

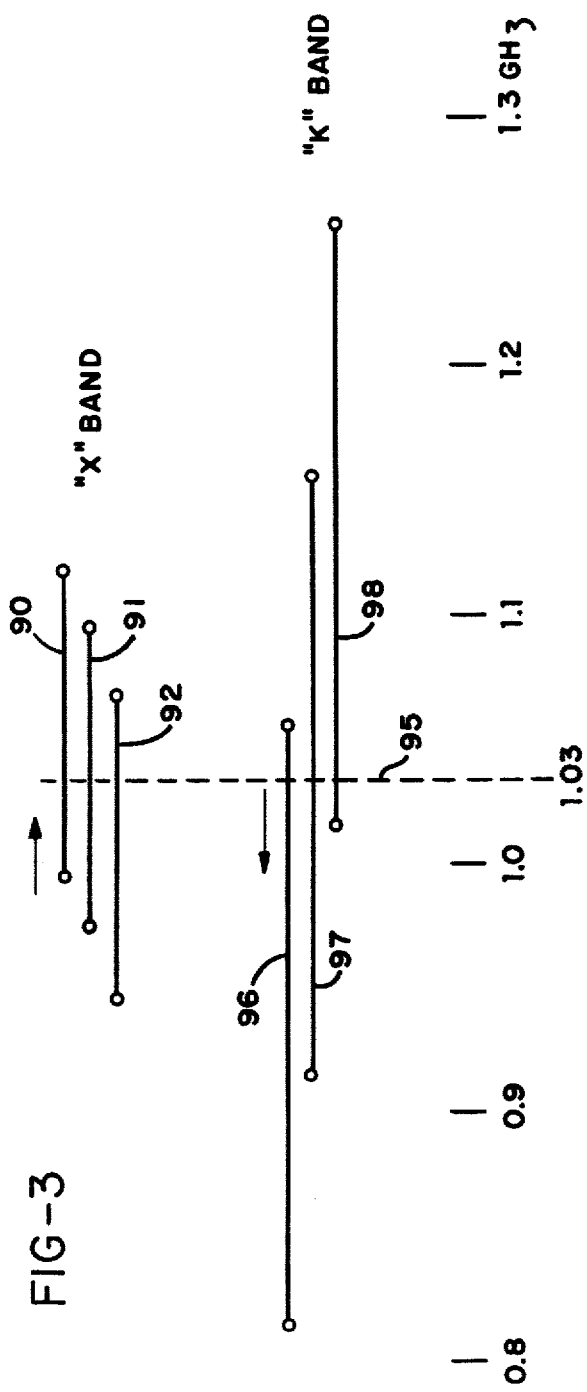

DUAL FREQUENCY RADAR RECEIVER

This is a continuation of application Ser. No. 41,264 filed May 21, 1979 now abandoned.

BACKGROUND OF THE INVENTION

This invention relates to a radar detecting receiver, and particularly to a receiver which is capable of simultaneously receiving quasi-harmonically related radio frequency signals.

This invention is particularly useful in detecting the presence of radar signals emitted in both the so-called X- and K-bands. The Federal Communications Commission of the United States has established that X-band radar signals be transmitted at 10.525 GHz with a tolerance of ±0.025 GHz, and that K-band radar signals be transmitted at 24.150 GHz with a tolerance of ±0.100 GHz. The most common method presently employed in readily available receivers for detecting these radar signals is a crystal detector; however, these detectors frequently are not sensitive enough to detect a radar signal over a long distance.

It is also possible to use superhetrodyne type receivers for the detection of radio frequency signals in this range, however, the bandwidth required to insure reception of a signal within the frequency limits above specified, and also taking into consideration frequency inaccuracies and drift within the receiver, limits the sensitivity of this type of device.

It is therefore desirable to develope a low cost, highly sensitive radar receiver which is capable of detecting radar signals anywhere within the range of frequencies specified for X- and K-band radar transmitters.

SUMMARY OF THE INVENTION

This invention relates to a superhetrodyne type receiver capable of detecting the presence of radar signals within either the so-called X- or K-bands and for providing an indication of which frequency is being received.

In the present invention, the sensitivity of the receiver is improved by limiting the bandwidth of the system to substantially less than the range of frequencies in which the radar frequency or radar signal may appear. For example, in the present invention, the receiver bandwidth is set at approximately 1.3 MHz, which is considerably less than the 50 MHz range for X-band signals or the 200 MHz range permitted for K-band signals.

Frequency detection is accomplished by varying the frequency of a local oscillator over a range sufficiently large that the resulting intermediate frequency will pass through a limited bandwidth circuit within the receiver. The rate at which the local oscillator frequency is varied is dependent on the bandwidth of the system and the duration of the radar pulse. X-band radar signals are usually continuous while K-band signals may be pulsed or continuous and have a minimum duration of approximately ten milliseconds. In the present invention, the local oscillator will scan the maximum bandwidth within seven milliseconds.

The frequency of the local oscillator is selected so that a single oscillator and mixer may be employed to receive both X- and K-band signals. Since these signals are quasi-harmonicaly related, i.e., the K-band signal is in the order of twice the frequency of an X-band signal, the first harmonic or fundamental of the local oscillator mixes with an X-band signal to produce a difference signal at the intermediate frequency, and the second harmonic of the oscillator mixes with a K-band signal also to produce a difference frequency at the intermediate frequency.

By using one local oscillator and one mixer, the mixer usually being physically associated with and made a part of the receiving antenna, dual band receiving capacity can be achieved at relatively low cost.

The output of the intermediate frequency amplifier may be mixed with the output of a second local oscillator, and this difference frequency is then applied through a band pass filter to a discriminator circuit. Although continuous wave signals are being detected, a frequency responsive discriminator may be employed to detect the presence of these signals due to the frequency varying nature of the local oscillator.

A low pass filter is coupled to the output of the discriminator to reduce the noise output thereof. The maximum frequency of the low pass filter is selected to be several times less than the bandwidth of the band pass filter but is set high enough to pass the amplitude varying signal from the discriminator present when a radar signal is detected.

The low pass filter is connected to a comparator circuit along with a first reference voltage, and only those signals which equal or exceed the reference voltage will produce an output therefrom.

Because a second local oscillator and IF stage are used, preferably at approximately 10 MHz, each radar signal detected will produce a pair of output pulses from the comparator circuit.

When the frequency of the first local oscillator is varied, the time spacing of these pairs of signals is indicative of the frequency of the radar signal. Because the fundamental frequency of the first local oscillator is used in detecting X-band signals, the time between the output pair of pulses for X-band signals will be approximately twice that of K-band signals where the second harmonic of the first local osciallator is used.

A detector circuit provided to sense the spacing between pulses and to provide an indication, preferably an audio signal, of which radar frequency has been detected.

It is therefore an object of this invention to provide a method of detecting the presence of radio frequency signals within either one of two distinct frequency ranges including the steps of receiving radio frequency signals occurring within both a first and a second frequency range, mixing the received radio frequency signals with the output of a single local oscillator whereby one harmonic of the local oscillator will mix with signals in the first frequency range to produce an output at an intermediate frequency and whereby another harmonic of the local oscillator will mix with signals in the second frequency to produce an output also at the same intermediate frequency, directing said intermediate frequency output signal through a bandwidth being substantially less than the range of frequencies in which the radio frequency signals are expected to occur, and repeatedly varying the frequency of the local oscillator over a range sufficiently large and at a rate sufficiently fast that any radio frequency signal occurring within either the first or the second range of frequencies will be detected.

It is a further object of this invention to provide an apparatus for detecting the presence of continuous or pulsed radio frequency signals occurring within a limited range of frequencies including means for receiving the radio frequency signals, a local oscillator, means for repeatedly varying the frequency of said local oscillator, mixer means having one input connected to said receiving means and another input connected to said local oscillator for mixing radio frequency signals with one harmonic of said local oscillator to produce an output at an intermediate frequency, and circuit means having a bandwidth substantially less than the limited range of frequency in which the radio frequency signals may occur, responsive to the output of said mixer for providing an output indication of the presence of the radio frequency signals, said circuit means including frequency-to-voltage converter means for converting the intermediate frequency signal to a voltage which changes at a rate related to the rate of change of frequency of said intermediate frequency within the response bandwidth of said circuit means, low pass filter means connected to the output of said converter means for reducing the noise component output thereof, the maximum frequency of said low pass filter means being several times less than the response bandwidth of said circuit means, and comparator means coupled to the output of said low pass filter means and to a source of reference voltage which is set at a level greater than the output of said low pass filter means whereby an output is obtained from said comparator as said converter means provides an output indicating the presence of a radio frequency signal within the limited range of frequencies, and wherein said means for varying the frequency of said local oscillator causes the intermediate frequency to vary over a range sufficiently large and at a rate sufficiently fast that any signal occurring within the limited range of frequencies will produce an intermediate frequency within the response bandwidth of said converter means.

BRIEF DESCRIPTION OF THE DRAWINGS

FIG. 2 are waveform diagrams showing the amplitude output waveforms from various components of FIG. 1;

FIG. 3 is a diagram illustrating the range of frequencies passing through the first IF amplifier for both X- and K-band signals as a result of varying the frequency of the first local oscillator;

DESCRIPTION OF THE PREFERRED EMBODIMENT

Figure 1:
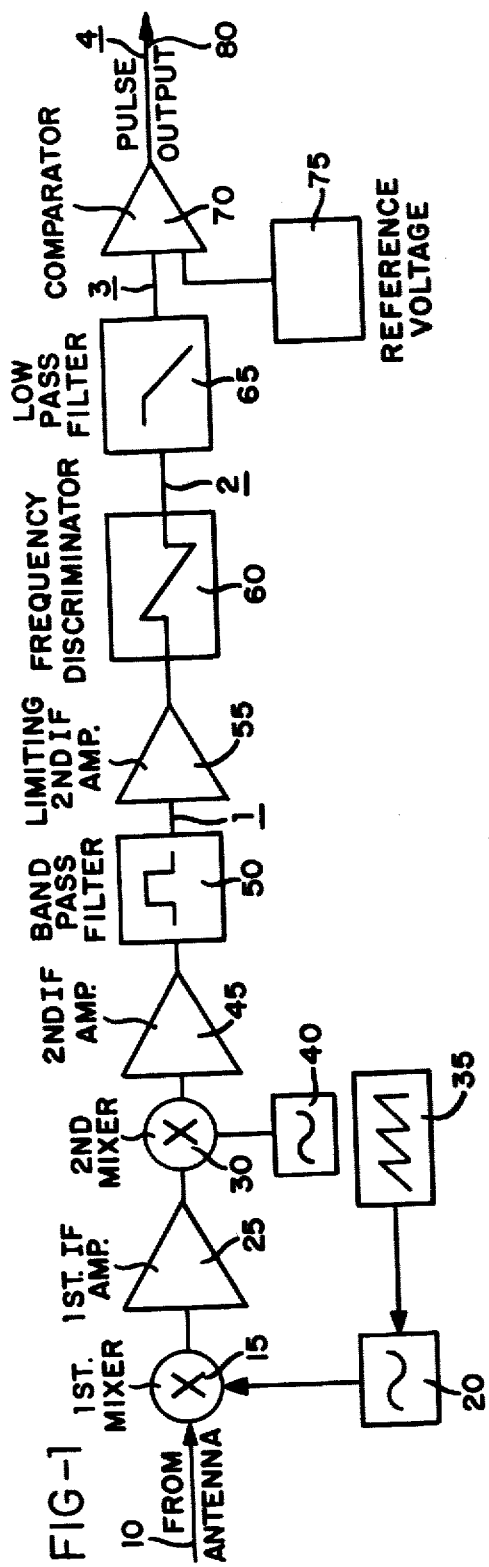
FIG. 1 is a block electrical diagram of the components comprising the present invention.

Referring now to the block diagram of FIG. 1, radio frequency signals 10 occurring within either a first or second frequency range are received by a conventional antenna system, not shown, and directed to a first mixer 15. The signals at the first and second radio frequencies are quasi-harmonically related, and in the preferred embodiment, these signals are nominally at 10.525 GHz and 24.150 GHz. The antenna may be of conventional design and may include filters for preventing signals at unwanted frequencies from being passed to the first mixer, and it may further include other filters for preventing outward radiation from the antenna of internally generated radio frequency signals. The first mixer 15 may be built into and made a part of the antenna system.

Also connected to the first mixer 15 is a variable frequency local oscillator 20 whose frequency is selected to provide an intermediate frequency adapted to pass through a first IF amplifier 25 to a second mixer 30. Since this invention is designed to detect the presence of both X-band signals, in the range of 10.525 GHz, and K-band signals in the range of 24.150 GHz, the frequency of local oscillator 20 was selected to be in the order of 11.5583 GHz. Thus, the fundamental or first harmonic of the local oscillator, when mixed with the X-band signal (11.5583−10.5250) will result in a difference or intermediate frequency of 1.033 GHz. The second harmonic of the local oscillator, when mixed with a K-band signal (24.150−2×(11.5583)), will also provide an intermediate frequency of 1.033 GHz.

Actually, the frequency of the local oscillator 20 is varied by sweep generator 35 through a range of approximately 0.120 GHz, or from 11.4983 to 11.6183 GHz, for reasons which will be later explained.

A second local oscillator 40 is tuned to 1.03 GHz, and its output is applied to the second mixer 30 where the difference signal, at approximately 10 MHz, is amplified by a second IF amplifier 45 and applied to a band pass filter 50. This filter is 1.3 MHz wide, and its output of which is connected to a limiting second IF amplifier 55 and then to a frequency discriminator circuit 60. The amplitude of the output waveform from the band pass filter 50 is shown as waveform #1, while the output of the frequency discriminator 60 is shown as waveform #2 in FIG. 2.

The output of the frequency discriminator is AC coupled to a low pass filter 65, and the output of the filter is shown as waveform #3 in FIG. 2.

A comparator circuit 70 receives the output of the low pass filter 65 and compares that against a reference voltage provided by the reference voltage source 75. The output 80 of the comparator circuit is shown as waveform #4 in FIG. 2.

The Rules of the Federal Communications Commission of the United States provide that an X-band radar signal be set at 10.525 GHz with a tolerance of plus or minus 0.025 GHz, and a K-band radar signal be set at 24.150 GHz with a tolerance of plus or minus 0.100 GHz. Therefore, the radar detector of this invention must be capable of receiving X-band signals in a 50 MHz range and K-band signals within a 200 MHz range. On the other hand, in order to increase the total sensitivity of the receiver, it is desired to keep the band pass as narrow as possible, and as pointed out above, the band pass filter 50 has been selected to be 1.3 MHz wide. Therefore, to insure reception of any signal within the range of frequencies permitted for either X- or K-band radars, the frequency of the local oscillator 20 is varied over a range sufficient to include both X- and K-band tolerances. Accordingly, the frequency of the local oscillator is varied over a 120 MHz range, over a 11.4983 to 11.6183 GHz. This is slightly more than is needed to insure reception of K-band signals and is significantly larger than that required to insure reception of X-band signals.

The following table illustrates the range of frequencies from the first mixer which result as a local oscillator sweeps through its range. The maximum and normal frequencies of both X- and K-band signals are listed along with the resulting IF output of the first IF amplifier 20.

TABLES

| | LOCAL OSCILLATOR (GHz) | IF Lo | IF Hi |
|---|---|---|---|
| X-BAND (GHz) | | | |
| MINIMUM 10.500 | 11.5583 ± 0.060 | 0.9983 | 1.1183 |
| NOMINAL 10.525 | 11.5583 ± 0.060 | 0.9733 | 1.0933 |
| MAXIMUM 10.550 | 11.5583 ± 0.060 | 0.9483 | 1.0683 |
| K-BAND (GHz) | | | |
| MINIMUM 24.050 | 2 × (11.5583 ± 0.060) | 0.8134 | 1.0534 |
| NOMINAL 24.150 | 2 × (11.5583 ± 0.060) | 0.9134 | 1.1534 |
| MAXIMUM 24.750 | 2 × (11.5583 ± 0.060) | 1.0134 | 1.2534 |

The information in the above table is illustrated in FIG. 3. Assuming that the local oscillator frequency varies from 11.4983 to 11.6183, resets and then varies again in a sawtooth pattern, then the upper line 90 in FIG. 3 represents the intermediate frequency varying between 0.9983 and 1.1183 GHz. The second line 91 represents a radar signal at its nominal frequency, and the bottom line 92 represents a radar signal at the maximum permitted X-band frequency. It will be noted that each of these signals crosses the 1.03 GHz frequency of the second local oscillator 40, represented by the line 95, and extends thereacross by at least 10 MHz.

The second set of lines 97, 98 and 99 on the chart of FIG. 3 represents the range of frequencies from the first IF amplifier 25 created by mixing K-band signals with the second harmonic of the local oscillator 20. These signals traverse twice the frequency range of X-band signals, but since they do so in the same amount of time, they will pass through the second intermediate frequency 45 amplifier at twice the rate of X-band signals. Again, each of these signals traverses the 1.03 GHz second local oscillator frequency by at least 10 MHz.

After mixing with the 1.03 GHz output of the second local oscillator 40 and the second mixer stage 30, the resulting signal passed through second IF amplifier 45 into the band pass filter 50.

The second IF amplifier 45 is tuned to 10 MHz, and because the first local oscillator 20 is sweeping, two output pulses from the band pass filter 50 will result for each sweep whenever a radar signal is detected. These two pulses represent the upper and lower sideband responses of the second mixer as the first IF signal sweeps through them. Thus, as this signal varies in frequency and approaches within 10 MHz of the local oscillator 40 from one direction, the difference signal will pass through band pass filter 50 as the first pulse, and the same thing will be true as the signal passes beyond the local oscillator frequency by 10 MHz, resulting in the second pulse.

Referring to FIG. 2, the waveform #1 output from the band pass filter 50 for each sweep cycle of the local oscillator will comprise two pulses. For a K-band signal the pulses will have width B and separated by time by T/2. The width B is half of A, and T/2 is half of T because the second harmonic of the first local oscillator 20 mixes with a K-band signal, and that frequency changes at twice the rate as the first harmonic or fundamental frequency varies under the control of sweeping generator 35.

The output of the band pass filter is applied to a limiting second IF amplifier 55, and its output is applied to a frequency discriminator 60, the output of which is shown as waveform #2 in FIG. 2. Although the signal being detected is a CW or continuous wave signal, the action of the first local oscillator in sweeping or varying in frequency, and the subsequent mixing of the resulting first IF signal with a second local oscillator generates a signal which "sweeps past" the center frequency of the discriminator cirxuit at a rate determined by the sweep generator 35.

Therefore, the discriminator 60 senses a signal which is continuously changing in frequency. Waveform 2 illustrates the output of the frequency discriminator wherein the random noise passing through the limiting second IF amplifier 55 is finally blanked when the input signal "captures" the limiter, and until that occurs, the output of the discriminator is a noise signal which varies at a random rate by the amount equal to the output of the discriminator.

When the signal captures the limiter 55, the discriminator 60 output will then vary, from one limit to the other depending on the polarity of the connections made within the discriminator. In the example shown, the output of the discriminator may first increase as the output is captured, then the polarity and amplitude decrease as the signal moves through the band pass filter, until it reaches the limits of the discriminator at which point the discriminator output returns to noise, and when the other pulse or side band is detected, the discriminator output polarity suddenly decreases and then increases to its highest value and then returns to noise.

The limiting second IF amplifier 55, the frequency discriminator 60 and the band pass filter 50 form a frequency-to-voltage converter means for converting the radio frequency input signals to a voltage which changes at a rate proportional to the rate of change of frequency in the signals. The response band width of this combination of elements is less than the range of frequencies through which the input signal, i.e., the first IF frequency, is varied.

A low pass filter 65 is connected to the output of the discriminator 60 to reduce the noise component output thereof, as shown in waveform #3 in FIG. 2, however, the discriminator output will remain substantially the same, and therefore pulses representing the upper and lower sidebands of the detected signals will be substantially larger than the noise level. The maximum frequency of the low pass filter is several times less (i.e., 1/10 to 1/100) than the response bandwidth of the converter means. In the present invention, the bandwidth of the band pass filter is 1.3 MHz wide, and the upper frequency limit of the low pass filter 65 is selected from 0.13 to 0.13 MHz.

A reference voltage is provided by source 75 to comparator circuit 70. The reference voltage level is shown in waveform #3, and is set at a value just above the noise so that any detected radio frequency pulses will provide an output from the comparator. When the filtered discriminator voltage equals or exceeds the reference voltage, a comparator output pulse results, as shown in waveform #4 in FIG. 3. The separation of the pulses is related to, although not exactly equal to, the separation of the pulses shown in waveform #1. It is clear from waveform #4 that the pulses 100, 101 for X-band signals are wider spaced than the pulses 105, 106 for K-band signals, and therefore means are provided to differentiate between these two signals and thus provide an indication of which type of radar signals are being received and detected.

Figure 4:
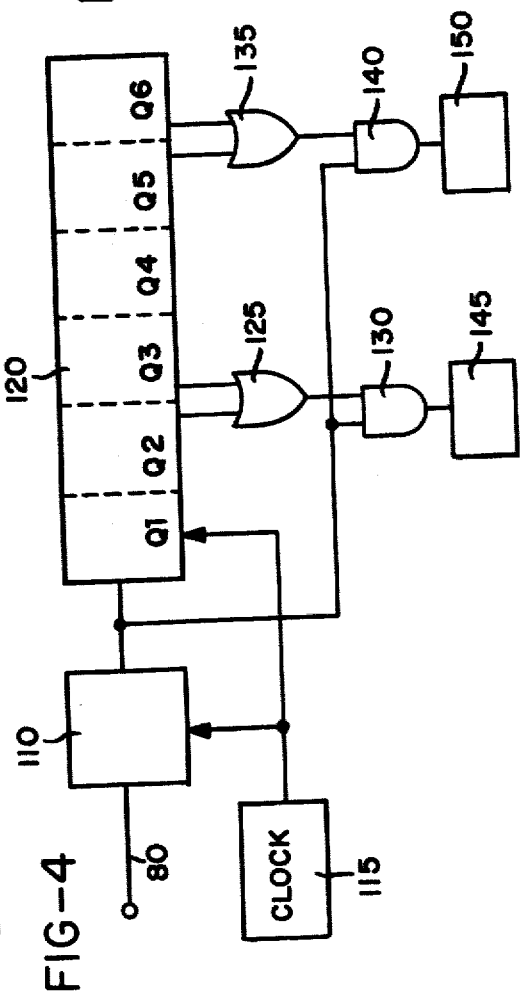
FIG. 4 is a block electrical diagram of a circuit for indicating whether an X-band or a K-band signal was detected.

Referring now to the block diagram of FIG. 4, showing the X-K differentiator circuit, the output 80 of comparator 70 is applied to a one-shot multivibrator 110 which operates under the control of a common clock 115. The clock frequency is selected to be thirty-two times the sweep frequency of the sweep generator 35.

The clock is also applied to control the operation of a delay shift register 120, the input to which is from the flip-flop or one-shot 110. The Q2 and Q3 outputs of the shift register 120 are connected to an OR gate 125, and the output of the OR gate is connected to an AND gate 130 along with the output of the one-shot 110. The Q5 and Q6 outputs of the shift register 120 are connected through an OR gate 135 to an AND gate 140, the other input of which is connected to the one-shot 110.

For K-band radar signals, the time between the pulses is T/2 so there will be a coincidence between the first pulse 105 appearing in the sequence, which is propagated through the shift register, and the second pulse 106 in the sequence which is fed directly to the AND gate. Therefore, the first pulse of a K-band signal will propagate only to the Q2 or Q3 level before the second pulse is detected, and a coincidence indicated by gate 130. A circuit 145 indicates reception of a K-band signal.

On the other hand, there is a longer time between the pulses representing an X-band signal, and therefore the first pulse 100 of an X-band signal will propagate through the shift register to the Q5 or Q6 position before the second pulse 101 is detected and applied to the AND gate 140 directly from one-shot 110. The output of gate 140 is applied to X-band indicator 150.

Because of slight variations in the sweep rate of the local oscillator and in the clock rate, both the Q2 and Q3 outputs of the register are applied to an OR gate 130 for K-band signal detection, and both the Q5 and Q6 outputs are connected to an OR gate 135 for X-band detection.

The Q1 and Q4 output connections to the shift register are unused to prevent any ambiguity in the differential between X- and K-band signals.

The indicator circuits 145 and 150 in one embodiment of the invention are audio devices which allow the user of the equipment to known whether an X-band or a K-band signal is being detected.

Figure 5:
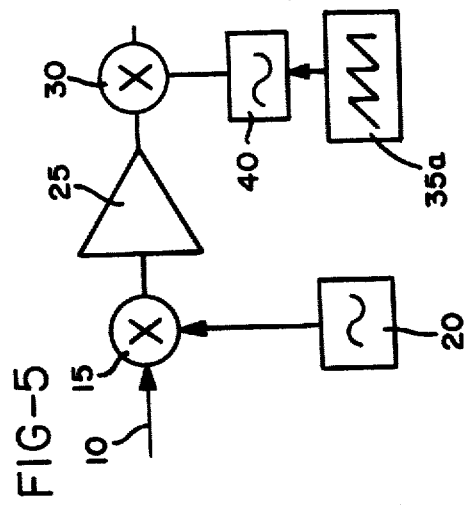
FIG. 5 is a partial block diagram showing another embodiment of the invention wherein the second local oscillator is varied in frequency.

FIG. 5 illustrates an alternate embodiment of the invention wherein a sweep generator 35a is connected to vary the frequency of the second local oscillator 40. The range of frequencies through which the sweep generator 35a causes the local oscillator 40 to sweep is sufficient to cause any signal appearing within either the first or the second range of frequencies, i.e., either X- or K-band signals, to fall within the bandwidth response characteristics of the circuits which follow. However, by varying the frequency of the second local oscillator, while holding the frequency of the first local oscillator 20 fixed, it will not be possible to distinguish between X- and K-band signals by means of the circuit of FIG. 4. The embodiment of FIG. 5, on the other hand, permits detection of both X- and K-band signals using less expensive components.

While the method and form of apparatus herein described constitutes a preferred embodiment of this invention, it is to be understood that the invention is not limited to this precise method or form of apparatus, and that changes may be made therein without departing from the scope of the invention which is defined in the appended claims.

What is claimed is:

1. Apparatus for detecting the presence of continuous or pulsed radio frequency signals occurring within either a first or a second range of frequencies, including:

means for receiving said radio frequency signals occurring within either a first or a second frequency range, a first local oscillator;

first mixer means having one input connected to said receiving means and another input connected to said first local oscillator for mixing said signals in the first frequency range with one harmonic of said local oscillator to produce an output at a first intermediate frequency, and for mixing said signals in the second frequency range with another harmonic of said local oscillator also to produce an output at said intermediate frequency, a second local oscillator, second mixer means including one input connected to the output of said first mixer means and another input connected to said second local oscillator for producing an output at a second intermediate frequency, means for varying the frequency of said first local oscillator, frequency-to-voltage converter means responsive to the output of said second mixer means and having a response bandwidth less than the first and second range of frequencies for converting said second intermediate frequency signals to a voltage which changes at a rate proportional to the rate of change of frequency within said response bandwidth, low pass filter means connected to the output of said converter means for reducing the noise component output thereof, the maximum frequency of said low pass filter being several times less than the response bandwidth of said converter means;

comparator means coupled to the output of said low pass filter means and to a reference voltage, said reference voltage being set at a level above the noise output of said low pass filter whereby an output is obtained from said comparator means as said converter means provides an output indicating the presence of radio frequency signals within either the first or second range of frequencies, wherein said means for varying the frequency of said first local oscillator changes the intermediate frequency over a range sufficiently large and at a rate fast enough that any radio frequency signal occurring within the first or second range of frequencies will fall within the response bandwidth of said converter means after mixing; and detecting means responsive to the output of said comparator means for detecting the occurrence of output pairs of pulses occurring within a first time interval indicating the presence of a radio frequency signal within the first range of frequencies, and further for detecting the occurrence of output pairs of pulses occurring within a second time interval indicating the presence of a radio frequency signal within the second range of frequencies.

2. Apparatus for detecting the presence of continuous or pulsed radio frequency signals occurring within either a first or a second range of frequencies, including:

means for receiving said radio frequency signals occurring within either a first or a second frequency range, a first local oscillator;

first mixer means having one input connected to said receiving means and another input connected to said first local oscillator for mixing said signals in the first frequency range with one harmonic of said local oscillator to produce an output at a first intermediate frequency, and for mixing said signals in the second frequency range with another harmonic of said first local oscillator also to produce an output at said first intermediate frequency, a second local oscillator, second mixer means including one input connected to the output of said first mixer means and another input connected to said second local oscillator for producing an output at a second intermediate frequency, a band pass filter connected to the output of said second mixer means, said filter having a bandwidth substantially less than the limited range of frequencies in which said radio frequency signals may occur, output circuit means responsive to the output of said band pass filter for producing output signals indicating whenever a radio frequency signals at either the first or second frequency has been detected, means for varying the frequency of said first local oscillator to cause the intermediate frequency to vary over a range sufficiently large and at a rate fast enough that any radio frequency signal occurring within the first or second range of frequencies will fall within the response bandwidth of said band pass filter, detecting means, responsive to said output circuit means, for indicating the frequency range of said radio frequency signal, including a shift register, including a plurality of stages, having an input connected to said output circuit means, clock means connected to said shift register for propagating the output signals from said output ciruit means though said shift register, and gate means having one input from a selected state of said shift register and another input connected to the input of said shift register for detecting the coincidence of output signals occurring within a predetermined time interval as a result of the detection of a signal within a selected frequency range.

* * * * *